United States Patent

Nomura et al.

[11] 3,906,517
[45] Sept. 16, 1975

[54] MANUAL STOP-DOWN DEVICE FOR CAMERAS HAVING AUTOMATIC EXPOSURE CONTROLS

[75] Inventors: Katsuhiko Nomura, Kawagoe; Fumio Urano, Omiya; Hiroshi Kurei, Kawagoe, all of Japan

[73] Assignee: Asahi Kogaku Kogyo Kabushiki Kaisha, Japan

[22] Filed: Feb. 22, 1974

[21] Appl. No.: 444,880

[30] Foreign Application Priority Data
Feb. 24, 1973  Japan.............................. 48-23867

[52] U.S. Cl. ................... 354/51; 354/38; 354/232; 354/272
[51] Int. Cl.² .......................................... G03B 7/08
[58] Field of Search .......... 250/206; 354/30, 51, 60, 354/36, 47, 272, 50, 232, 40, 48, 38

[56] References Cited
UNITED STATES PATENTS

| | | | |
|---|---|---|---|
| 3,418,479 | 12/1968 | Schmitt.............................. | 250/206 |
| 3,623,410 | 11/1971 | Mita...................................... | 354/30 |
| 3,641,891 | 2/1972 | Burgarella.......................... | 354/51 X |
| 3,791,277 | 2/1974 | Kobori et al.......................... | 354/51 |

*Primary Examiner*—Monroe H. Hayes
*Assistant Examiner*—James LaBarre
*Attorney, Agent, or Firm*—Steinberg & Blake

[57] ABSTRACT

A camera which is capable of automatically determining exposure of the film and which has a manually operable diaphragm stop-down device enabling the operator to stop the diaphragm down manually prior to film exposure. The camera has a circuit for automatically determining the film exposure, and this circuit is capable of measuring the light which travels through the fully open diaphragm of the camera. An electrical quantity corresponding to the light which is measured in this way is stored in a memory capacitor which is connected by a normally closed switch to the light-measuring structure of the circuit. The structure for manually stopping the diaphragm down to a preselected aperture is operatively connected with the latter normally closed switch to open the latter prior to manual stopping down of the diaphragm so that in this way an erroneous operation of the circuitry which automatically determines the exposure will be avoided.

5 Claims, 7 Drawing Figures

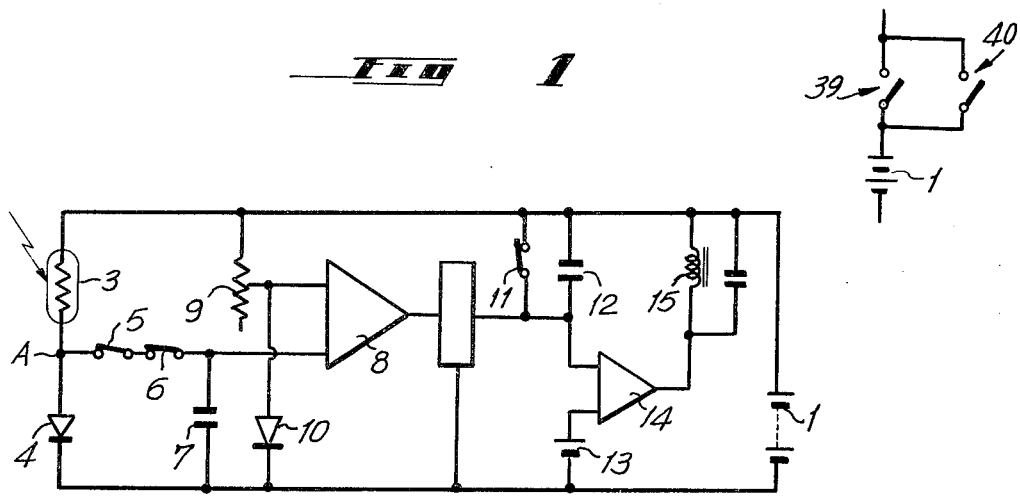
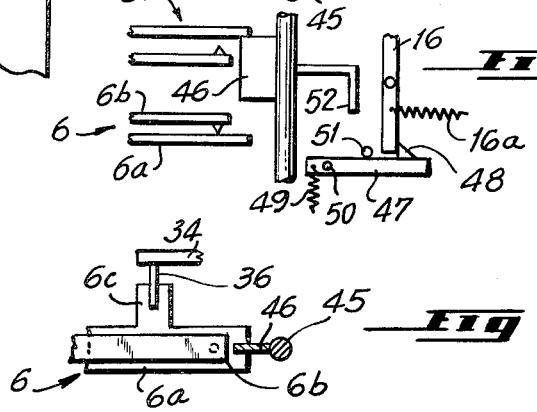
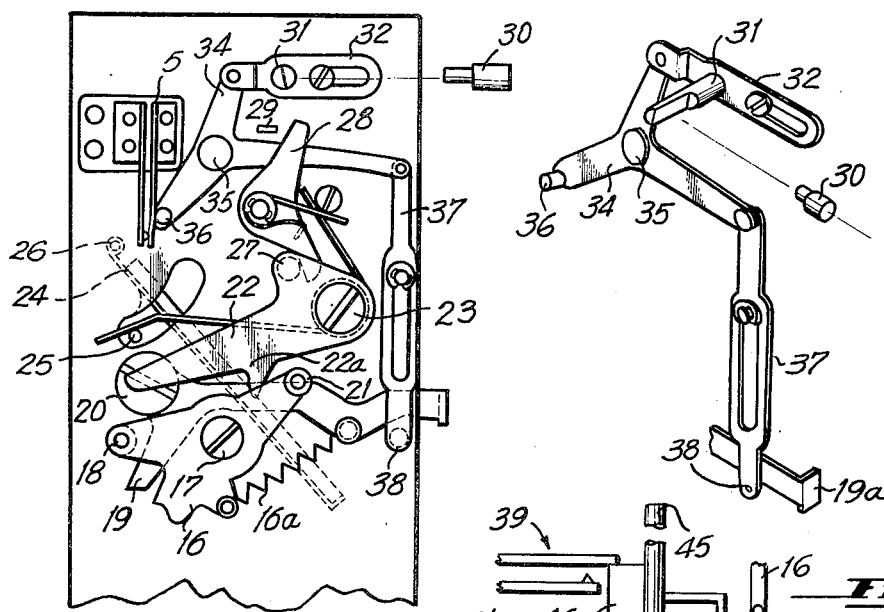
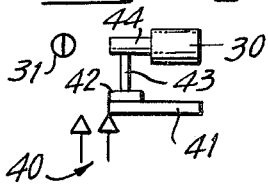

MANUAL STOP-DOWN DEVICE FOR CAMERAS HAVING AUTOMATIC EXPOSURE CONTROLS

BACKGROUND OF THE INVENTION

The present invention relates to cameras.

In particular, the present invention relates to cameras which are capable of automatically determining the extent to which film is exposed and which determine the exposure in accordance with a number of factors one of which is the light which travels through the objective of the camera.

The present invention relates in particular to a camera of the above type which has a device enabling the operator to manually stop the diaphragm down to a preselected aperture.

Cameras of the above type are generally single lens reflex cameras which have, usually in the region of the viewfinder of the camera, a structure for measuring the light after it has travelled through the objective of the camera. With cameras of this type it is possible for the operator to visually observe the depth of field at the particular diaphragm setting which is selected for exposure. In general, cameras of the type which measure light which has travelled through the objective are of two types. One type will measure light only after the operator has stopped the diaphragm down to the preselected aperture. This type of camera thus requires the operator to stop the diaphragm down to the preselected aperture before an exposure is made. The other type of camera measures the light and permits viewing of the subject through the viewfinder while the diaphragm is in its fully open position, and the diaphragm is stopped down automatically just prior to opening of the shutter in response to manipulation of the shutter-tripping structure by the operator. The latter type of camera is encountered far more frequently than the former because the full-aperture type of light-measurement and viewing of the subject is far more convenient than the former type of camera which requires the operator to stop the diaphragm down manually prior to tripping of the shutter.

However, with this second type of camera which measures the light through the fully open diaphragm, problems are encountered when the camera is provided with a device which enables the operator to observe the object to be photographed through the diaphragm when the latter has been manually stopped down, so as to observe, for example, the depth of field. When, with such a camera, the operator stops the diaphragm down manually to the preselected aperture, there is an unavoidable decrease in the light input, resulting from the decrease in the size of the diaphragm aperture, and as a result an error will occur in the automatic exposure unless care is taken to correct this error as by making sure to return the diaphragm to its fully open position prior to tripping of the shutter. Thus if the operator should not return the diaphragm to its fully open position prior to automatic exposure control with this latter type of camera, when the shutter is released with the manually stopped-down diaphragm an exposure error will result.

SUMMARY OF THE INVENTION

It is accordingly a primary object of the present invention to provide a camera which will avoid the above drawbacks.

In particular it is an object of the present invention to provide a camera which measures light with a fully open diaphragm and which enables the operator to stop the diaphragm down manually without the possibility of an error in the exposure of the film.

Thus, it is an object of the present invention to provide a camera structure which will measure the light only through the fully open diaphragm even if the operator chooses to stop the diaphragm down manually prior to film exposure.

Furthermore it is an object of the present invention to provide a camera of this type which will enable the above objects to be achieved while still permitting the camera to operate properly even if the operator does not choose to stop the diaphragm down manually.

In addition it is an object of the present invention to provide a structure of this type which is relatively simple, rugged, and entirely reliable in its operation.

In accordance with the invention the camera has a diaphragm stop-down means for stopping the diaphragm down from a fully open light-measuring position to a preselected exposure aperture position. A manually operable means is operatively connected with the diaphragm stop-down means for manually operating the latter. A circuit means is provided for automatically determining the exposure time, and this circuit means includes a light-measuring means for measuring the light travelling through the fully open diaphragm, the circuit means further including a memory capacitor means for storing an electrical quantity in accordance with the light measured by the light-measuring means. Furthermore the circuit means includes a normally closed switch means connected between the light-measuring means and the memory capacitor means for transmitting to the latter an electrical quantity to be stored in accordance with the light measured by the light-measuring means. The manually operable means which operates the diaphragm stop-down means is operatively connected with this normally closed switch means to open the latter prior to stopping down of the diaphragm manually, so that in this way the electrical quantity which is stored by the capacitor means will not be an erroneous quantity resulting from measurement through the stopped down diaphragm.

BRIEF DESCRIPTION OF DRAWINGS

The invention is illustrated by way of example in the accompanying drawings which form part of this application and in which:

FIG. 1 is a schematic wiring diagram of the circuitry for automatically determining film exposure;

FIG. 2 is a fragmentary partly schematic illustration of the camera mechanism for automatically and manually stopping down the diaphragm as well as for controlling the circuitry of FIG. 1 to prevent an erroneous exposure in the case where the diaphragm is manually stopped down;

FIG. 3 is a fragmentary schematic perspective illustration of the manually operable means of FIG. 2;

FIG. 4 is a schematic representation of a variation in part of the circuitry of FIG. 1;

FIG. 5 schematically illustrates how part of the structure of FIG. 4 is operated by the manually operable means of the invention;

FIG. 6 is a schematic illustration of part of the shutter-tripping means which cooperates with the part of the shutter-tripping means which is shown in FIG. 2 and which is illustrated schematically in FIG. 6, FIG. 6 also showing how the shutter-tripping means cooperates with circuitry as illustrated in FIGS. 1 and 4; and FIG. 7 illustrates in a schematic partly sectional fragmentary plan view a variation according to which a single switch is used instead of a pair of series-connected switches.

DESCRIPTION OF PREFERRED EMBODIMENTS

Referring first to FIG. 1 there is illustrated therein one possible example of circuitry used in an automatic camera of the above general type for automatically determining the extent to which film is exposed. The circuit means which is illustrated in FIG. 1 includes a power source 1 electrically connected with a light-information output circuit portion which includes the series-connected photosensitive means 3 for receiving light which has travelled through the objective of the camera and logarithmic compression element 4. Assuming that the resistance of the photosensitive means 3 varies according an exponential function of the light input, then at the junction A between components 3 and 4 there will develop a voltage $V_{BV}$ which varies linearly. This voltage $V_{BV}$ is applied, as an electrical quantity corresponding to the light received, to a memory capacitor means 7 as well as to an operation amplifier 8. For this purpose there is connected between the memory capacitor means 7 and the light-measuring means 3, 4 a normally closed switch means 5, 6 which in the illustrated example includes a pair of series connected normally closed switches 5 and 6. The switch 5 is a manually operable switch and the switch 6 is an automatically operable switch, as will be apparent from the description below. In addition to its input which is connected to the memory capacitor means 7, the operation amplifier 8 has another input to which is applied a voltage $V_{(AV-SV)}$ determined by the film speed, in accordance with which a variable resistor 9 is set, this variable resistor 9 being electrically connected with a second logarithmic compression element 10 as illustrated. During normal exposure operations, the time interval between actual release of the structure for swinging a mirror of the camera up to an exposure position and tripping the shutter and actual swinging of the mirror followed by tripping of the shutter is utilized for opening the normally closed switch means 5, 6, and in this case it is the switch 6 which is opened. In this way the charge stored at the memory capacitor means 7, corresponding to the light measurement made by the light-measuring means 3, 4, is retained at the memory capacitor means 7 in the form of the voltage $V_{BV}$. The operational amplifier 8 performs an operation according to the relationship $V_{TV} = V_{BV} - (V_{AV} - V_{SV})$, without any undesirable influence from the light variation resulting from stopping down of the diaphragm and swinging up of the mirror. The circuitry includes a timing switch 11 which is opened in a known way in response to release of the leading curtain of the focal plane shutter in order to initiate the exposure, and this timing switch 11 is connected in parallel across a timing capacitor 12 so that the latter starts to be charged simultaneously with the opening of the shutter. The circuitry includes a differential switching circuit means 14 which in a known way compares the voltage across the terminals of capacitor 12 with the voltage from a constant voltage source 13. When the voltage across the terminals of the capacitor 12 reaches a constant value as compared with the voltage from the constant voltage source 13, the differential switching circuit means 14 is automatically reversed so as to deenergize the electromagnet 15 which until this moment remains energized to prevent release of the trailing shutter curtain. Thus upon this reversal of the switching circuit 14 the electromagnet 15 is deenergized to release the trailing curtain which now runs down to close the shutter and terminate the exposure.

FIG. 2 illustrates a manually operable means of the invention for enabling the diaphragm to be stopped down manually without interfering with the proper operation of the circuit means of FIG. 1. FIG. 2 schematically illustrates a mirror box which serves to support for swinging movement the inclined mirror shown in dotted lines carried by a frame 24 supported for swinging movement on a pin or rod 26. This mirror will receive light in a known manner travelling from an objective from the right toward the left to the mirror shown in FIG. 2. The wall of the mirror box which is visible in FIG. 2 carries part of a shutter-tripping means which includes a swingable lever 16 supported for swinging movement on a pivot pin 17 carried by the wall of the mirror box shown in FIG. 2. When the film in the camera is wound so as to situate the next unexposed film frame in a position for exposure, the lever 16 is moved in a known way in a clockwise direction as viewed in FIG. 2, so as to tension the spring 16a, storing in this way the force for tripping the shutter. When the shutter-tripping means which includes the lever 16 is manually operated, the lever 16 is released to be driven by the spring 16a in a counterclockwise direction, as viewed in FIG. 2, around the pivot pin 17. A diaphragm stop-down means 19 is illustrated in FIG. 2 in the form of a lever supported for swinging movement on a pivot 20 carried by the wall of the mirror box which is visible in FIG. 2. This diaphragm stop-down lever 19 has a downwardly extending extension engaged by a roller 18 which is carried by the left end of the lever 16, as viewed in FIG. 2. At its right end the lever 19 has a free end portion 19a (FIG. 3) which in a known way stops the diaphragm down to the preselected aperture in response to counterclockwise turning of the lever 19 around the pivot 20, as viewed in FIG. 2. Thus, during the initial part of the counterclockwise turning of the lever 16 of the shutter-tripping means the diaphragm stop-down means 19 is automatically operated to stop the diaphragm down to the preselected aperture.

The lever 16 has an arm which carries a roller 21 so that the latter turns with the lever 16, and in the path of turning of the roller 21 is located a projection 22a of a mirror-swinging lever 22 which is supported by a pivot 23 on the illustrated wall of the mirror box to turn in a clockwise direction when the projection 22a is engaged by the roller 21. The mirror carried by the frame 24 is normally retained in the illustrated inclined position by a wire spring which extends around the pivot 23 and presses against a pin 25 carried by a projection of the frame 24 and extending through a curved slot in the mirror box wall which is visible in FIG. 2, this curved slot having its center curvature in the axis of the rod 26 around which the mirror swings. The mirror swinging lever 22 engages the pin 25 so as to swing the mirror from the illustrated inclined position up to a substantially horizontal position enabling an exposure to be made by light which now travels beneath the mirror toward the film to expose the latter upon opening of the shutter.

The mirror-swinging lever 22 carries a pin 27 which engages a shutter-tripping lever 28 supported for turning movement on a suitable pivot pin carried by the illustrated mirror box wall. This lever 28 will thus be swung in a counterclockwise direction, as viewed in FIG. 2, in opposition to a spring which acts on the lever 28 to maintain it in engagement with the pin 27. As the lever 28 turns in a counterclockwise direction, as viewed in FIG. 2, it engages a shutter-releasing pawl 29 which in its rest position maintains the cocked leading curtain of the shutter in a position in preparation for running down in advance of the trailing curtain to open the shutter. Thus, with this mechanism just after the mirror is swung up the shutter-tripping pawl 29 is turned by the lever 28 to release the leading curtain, thus opening the shutter, and of course at this time the trailing curtain is still maintained against running down by the energized electromagnet 15 as described above in connection with FIG. 1. In the manner described above after the exposure time which is automatically determined with the circuitry of FIG. 1 the electromagnet is deenergized to release the trailing shutter curtain, and the shutter will now close. During the subsequent film advance the shutter is cocked simultaneously with the return of the lever 16 to the position shown in FIG. 2 where the spring 16a is again tensioned.

As is shown schematically in FIG. 6, the lever 16, in response to the cocking operation, is turned in opposition to the spring 16a in a clockwise direction, as viewed in FIG. 6, to be engaged by a tooth 48 on a lever 47 so as to be retained in the cocked position. This lever 47 is urged by a spring 49 around a pin 50 into engagement with a stop 51. The shutter tripping means includes in addition to the lever 16 a plunger 45 which can be depressed by the operator, this plunger 45 carrying a projection 52 which in response to the downward movement of the plunger 45 by the operator turns the lever 47 so as to displace the tooth 48 away from the lever 16 thus releasing the latter so that the above operations will be carried out.

In addition to the above-described structure utilized during normal automatic operation, the invention includes a manually operable means for operating the diaphragm stop-down means 19. For this purpose there is accessible to the operator at the front of the camera a button 30 which is depressed by the operator inwardly toward the rear of the camera. As the button 30 is moved rearwardly, an elongated shank 44 (FIG. 5) thereof engages a flat surface of a pin 32 which is fixed to and projects from a slide member 32 guided, as by the illustrated pin-and-slot structure, for substantially horizontal sliding movement. The rear end of the slide member 32 is pivotally connected with the top end of a lever means 34 of the manual operable means, this lever means 34 being supported for swinging movement on a pin 35 carried by the illustrated wall of the mirror box. Thus, the manually operable means which includes the lever 34 will produce a counterclockwise turning of the latter, as viewed in FIG. 2, in response to rearward depression of the button 30. A lower arm of the lever 34 carries a pin 36 which maintains the switch 5 of the normally closed switch means 5, 6 in its closed position. This switch 5 is composed of a springy contact member which by its own inherent resiliency moves away from the contact carried by the left arm of the switch 5, as illustrated in FIG. 2. Thus during the initial part of the counterclockwise turning of the lever 34 the pin 36 moves toward the right, as viewed in FIG. 2, releasing the right springy contact member so that it automatically moves due to its own resiliency away from the contact carried by the left member and thus the switch 5 is automatically opened. In this way the normally closed memory switch means 5, 6 is manually opened to enable the memory capacitor means 7 to retain the information according to the light measurement made with the fully open aperture.

The lever 34 has an elongated arm extending to the right from the pivot 35, as viewed in FIG. 2, and this arm is swingably connected with an elongated lost-motion connection means 37 in the form of an elongated plate guided by a pin-and-slot structure as illustrated. This lost-motion connection includes in addition to the elongated plate 37 a pin 38 connected to the bottom end of the plate 37 and extending beneath the lever 19. Thus, during the initial part of the turning of the lever means 34 of the manually operable means the switch 5 opens while the pin 38 moves upwardly toward but has not yet engaged the lever 19. It is only after the switch 5 opens that the pin 38 engages and turns the lever 19 so as to stop the diaphragm down to the preselected aperture, and in this way with the structure of the invention the normally closed switch means 5,6 is opened prior to stopping of the diaphragm down manually when the operator chooses to operate the button 30 for manually stopping the diaphragm down. Thus when the shutter-tripping means is subsequently actuated to open the shutter and make an exposure an erroneous light measurement will not be made through the stopped down diaphragm.

Therefore, the structure of the invention enables a single lens reflex camera equipped with a manual diaphragm stop-down device and with an automatic exposure determining circuit of the full-aperture light-measuring type to operate properly when the diaphragm is manually stopped down to observe the depth of field inasmuch as the manual switch 5 of the normally closed memory switch means 5, 6 is opened in the first stage of operation of the manually operable means so that the light input information which corresponds to the light travelling through the objective is memorized by the memory capacitor means 7 in the form of an electrical quantity determined by the electrical charge on the capacitor means 7, this electrical quantity being determined when the aperture is still fully open. When the diaphragm is subsequently closed to the preselected aperture by manual operation of the lever 19, the quantity of light received by the light-measuring means 3,4 will vary. However under these circumstances when the shutter release button 45 is depressed this variation in the light input quantity will have no influence on the exposure time and a correct exposure will be achieved. Thus it will be seen that with the manual stop-down device according to the present invention an error in exposure which otherwise might occur with such a manual stop-down device can be eliminated and an optimum exposure will be achieved. It will be noted that the device of the present invention is simple in its mechanical construction and can be economically manufactured while having a reliable operation.

For the sake of simplicity the structure has been described above in connection with a circuit means which is shown in FIG. 1 as being permanently closed. However in order to minimize waste of power from the source 1, the circuit means may be provided with a main power switch 39 which is illustrated in FIG. 4. This main power switch 39 is automatically closed in response to depression of the plunger 45 during the initial part of the downward movement thereof. Thus as is shown in FIG. 6, the initial increment of movement of the element 45 in a downward direction by the operator will enable the switch 39 to close, and immediately thereafter the projection 46 which usually maintains the switch 39 open moves away from the closed switch 39 into engagement with the switch element 6 to open the latter, thus opening the normally closed switch means 5, 6 at the switch element 6 thereof. Then, subsequent to the opening of the switch 6 the element 52 will release the lever 16 in a manner described above.

However, in this case, where the circuit means of FIG. 1 is provided with the main power switch 39, there is also provided an auxiliary power switch 40 connected in parallel across the main power switch 39. This arrangement is illustrated in FIG. 4. With this construction, the auxiliary power switch 40 is closed in response to operation of the manually operable means prior to opening of the normally closed switch means 5,6 at the switch element 5 thereof which is connected in series with the switch element 6 as illustrated in FIG. 1. For this purpose, as is shown schematically in FIG. 5, the shank 44 of the button 30 carries an extension 43 which in turn carries an insulating block 42 provided with a conductive strip 41 which is adapted to bridge across the contacts of the switch 40 so as to close the latter in response to the initial increment of movement of the button 30, prior to swinging of the lever 34 to open the switch 5. Therefore, with this construction during the first stage of manual operation of the manually operable means the auxiliary power switch 40 is closed, during the second stage the memory switch means 5 is opened, and during the third stage the diaphragm is stopped down to the preselected aperture.

Although in the embodiment illustrated the normally closed memory switch means 5, 6 takes the form of a pair of separate switches 5 and 6 which are connected in series, it is also possible to provide the same functions as the separate switches 5 and 6 by way of a single switch. Thus, as is indicated in FIG. 7, the switch 6 may be modified so as to be capable of performing the functions of both of the switches 5 and 6 described above. For this purpose the lower blade 6a of the switch 6 has an extension 6c which extends beneath the pin 36 of the lever 34, and of course the switch 5 is omitted, only the single switch 6 being connected between the memory capacitor 7 and the junction A with this embodiment. The upper blade 6b carries the contact which normally is engaged by the blade 6a so as to maintain the switch 6 in its closed position. When the shutter-tripping plunger 45 is moved downwardly, the projection 46 will engage the blade 6a so as to open the switch 6 during the normal automatic operation of the camera as described above. However, in this case when the lever 34 is turned in a counterclockwise direction around the pin 35, in response to rearward movement of the button 30 by the operator, as described above, for the purpose of manually stopping down the diaphragm, the pin 36 will move downwardly through a distance sufficient to engage the extension 6c of the blade 6a and displace the latter downwardly away from the contact carried by the blade 6b, so that in this case the single switch 6 will also be opened in the same way as the switch 5 described above. Thus it becomes possible with a single switch to perform the operations of both of the switches 5 and 6 as described above.

What is claimed is:

1. In a camera, having a shutter and a diaphragm stop-down means for stopping said diaphragm down from a fully open light-measuring position to a preselected exposure aperture, circuit means for automatically determining exposure time, said circuit means including a light-measuring means for measuring light received through a fully open diaphragm, a memory capacitor means for storing an electrical quantity corresponding to the light measured by said light-measuring means, and normally closed switch means connected between said light-measuring means and memory capacitor means for transmitting to the latter the electrical quantity to be stored in accordance with the light measured by said light-measuring means, shutter-tripping means operatively connected with said shutter to trip the latter to make an exposure, said shutter-tripping means being operatively connected with said normally closed switch means and with said diaphragm stop-down means for first opening said normally closed switch means and then operating said diaphragm stop-down means prior to tripping of the shutter, and manually operable means operatively connected with said diaphragm stop-down means for manually operating the latter independently of said shutter-tripping means to stop the diaphragm down to the preselected aperture for viewing the depth of field prior to an exposure, said manually operable means being operatively connected with said switch means for opening the latter prior to operating said diaphragm stop-down means for stopping down of the diaphragm so that the electrical quantity stored by said memory capacitor means will not be influenced by the manual stopping down of the diaphragm for the purpose of preliminarily viewing the depth of field.

2. The combination of claim 1 and wherein said manually operable means includes a lever means to be turned from a rest position by the operator, said normally closed switch means moving from a closed to an open position in response to turning of said lever means by the operator, and said manually operable means including a lost-motion transmission means extending between said lever means and said diaphragm stop-down means for operating the latter to stop the diaphragm down to the preselected aperture in response to manual turning of said lever means after opening of said normally closed switch means.

3. The combination of claim 1 and wherein said circuit means includes a main power switch operatively connected with said shutter-tripping means to be closed thereby for energizing said circuit means prior to opening of said normally closed switch means, and an auxiliary power switch connected in parallel across said main power switch and operatively connected with said manually operable means to be closed thereby prior to opening of said normally closed switch means.

4. The combination of claim 1 and wherein said normally closed switch means includes a pair of series-connected switches one of which is opened in response to operation of said shutter-tripping means and the other of which is opened in response to operation of said manually operable means.

5. The combination of claim 1 and wherein said normally closed switch means consists of a single switch which is opened in response to operation of said shutter-tripping means and which is also opened in response to operation of said manually operable means.

* * * * *